US009519464B2

(12) United States Patent
Dang et al.

(10) Patent No.: US 9,519,464 B2
(45) Date of Patent: Dec. 13, 2016

(54) CODE RECOMMENDATION

(71) Applicant: Microsoft Corporation, Redmond, WA (US)

(72) Inventors: Yingnong Dang, Sammamish, WA (US); Chenglin Zhong, Guangdong (CN); Qian Wu, Beijing (CN); Han Yin, Hubei (CN); Niko Schwarz, Adliswil (CH); Dongmei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/488,104

(22) Filed: Sep. 16, 2014

(65) Prior Publication Data

US 2015/0378692 A1    Dec. 31, 2015

(30) Foreign Application Priority Data

Jun. 30, 2014    (WO) ................ PCT/CN2014/081228

(51) Int. Cl.
*G06F 9/44*    (2006.01)
(52) U.S. Cl.
CPC . *G06F 8/36* (2013.01); *G06F 8/20* (2013.01); *G06F 8/30* (2013.01)
(58) Field of Classification Search
None
See application file for complete search history.

(56) References Cited

U.S. PATENT DOCUMENTS

| | | | |
|---|---|---|---|
| 8,271,939 B1* | 9/2012 | Krishnaiyer | G06F 8/33 707/795 |
| 2003/0079199 A1* | 4/2003 | Barsness | G06F 8/33 717/100 |
| 2005/0125773 A1* | 6/2005 | Hawley | G06F 8/33 717/109 |
| 2007/0168946 A1* | 7/2007 | Drissi | G06F 8/71 717/110 |
| 2008/0134142 A1* | 6/2008 | Nathan | G06F 8/73 717/114 |

(Continued)

OTHER PUBLICATIONS

Zhong, et al., "MAPO: Mining and Recommending API Usage Patterns", In Proceedings of the 23rd European Conference on ECOOP, Jul. 6, 2009, 25 pages.

(Continued)

*Primary Examiner* — Isaac T Tecklu
(74) *Attorney, Agent, or Firm* — Tom Wong; Micky Minhas; Zete Law, P.L.L.C.

(57) ABSTRACT

The disclosure generally relates to code recommendation. In one embodiment, code snippets may be extracted using an invocation-centered code slicing process and then grouped according to the method usages. For each method usage, a representative code snippet may be selected and stored in the knowledge base in association with metadata. In operation, the programming context may be obtained and used to query the knowledge base to retrieve one or more code snippets for recommendation. In one embodiment, the recommended code snippets may be ranked to improve the utility and user friendliness, and the metadata may be used to provide variation points and possibly other auxiliary information to improve the operation efficiency and user experience.

20 Claims, 5 Drawing Sheets

(56) References Cited

U.S. PATENT DOCUMENTS

| | | |
|---|---|---|
| 2009/0254880 A1 | 10/2009 | Gryko et al. |
| 2009/0292527 A1 | 11/2009 | Anderson et al. |
| 2011/0271258 A1* | 11/2011 | Park .................... G06F 8/33 717/127 |
| 2012/0174061 A1* | 7/2012 | McCollum .............. G06F 8/33 717/106 |
| 2013/0007700 A1* | 1/2013 | Villar .................... G06F 8/33 717/109 |
| 2013/0074036 A1 | 3/2013 | Brandt et al. |
| 2014/0013299 A1 | 1/2014 | Bordeaux et al. |
| 2014/0075414 A1* | 3/2014 | Fox ....................... G06F 8/36 717/121 |
| 2014/0359574 A1* | 12/2014 | Beckwith ............... G06F 8/33 717/113 |

OTHER PUBLICATIONS

Song, et al., "Extracting the Data-Retrieval Snippets from the Source Code of API Clients", In Proceedings of IEEE International Conference on Semiconductors Electronics, Jun. 2, 2012, 13 pages.
Wang, et al., "APIExample: An Effective Web Search based Usage Example Recommendation System for Java APIs", In 26th IEEE International Conference on Automated Software Engineering, Nov. 6, 2011, 4 pages.
Moritz, et al., "ExPort: Detecting and Visualizing API Usages in Large Source Code Repositories", In IEEE/ACM 28th International Conference on Automated Software Engineering, Nov. 11, 2013, 6 pages.
Heinemann, et al., "Identifier-Based Context-Dependent API Method Recommendation", In 16th European Conference on Software Maintenance and Reengineering, Mar. 27, 2012, 10 pages.
Roy, et al., "The Vision of Software Clone Management: Past, Present, and Future (Keynote Paper)", In IEEE Conference on Software Maintenance, Reengineering and Reverse Engineering, Feb. 3, 2014, 16 pages.
Alnusair, et al., "Effective API Navigation and Reuse", In IEEE International Conference on Information Reuse and Integration, Aug. 4, 2010, 6 pages.
Bellon, et al., "Comparison and Evaluation of Clone Detection Tools", In Journal IEEE Transactions on Software Engineering, vol. 33, No. 9, Sep. 2007, 15 pages.
Bruch, et al., "Learning from Examples to Improve Code Completion Systems", In Proceedings of the 7th Joint Meeting of the European Software Engineering Conference and the ACM SIGSOFT Symposium on the Foundations of Software Engineering, Aug. 23, 2009, 10 pages.
Raymond, et al., "Synthesizing API Usage Examples", In Proceedings of the 34th International Conference on Software Engineering, Jun. 2, 2012, 11 pages.
Dang, et al., "XIAO: Tuning Code Clones at Hands of Engineers in Practice", In Proceedings of the 28th Annual Computer Security Applications Conference, Dec. 3, 2012.
Goues, et al., "Specification Mining with Few False Positives", In Proceedings of the 15th International Conference on Tools and Algorithms for the Construction and Analysis of Systems: Held as Part of the Joint European Conferences on Theory and Practice of Software, Mar. 22, 2009, 15 pages.
Jiang, et al., "DECKARD: Scalable and Accurate Tree-based Detection of Code Clones", In Proceedings of 29th International Conference on Software Engineering, May 20, 2007, 10 pages.
Kim, et al., "Towards an Intelligent Code Search Engine", In Proceedings of 24th AAAI Conference on Artificial Intelligence, Jul. 11, 2010, 6 pages.

Kim, et al., "Adding Examples into Java Documents", In IEEE/ACM International Conference on Automated Software Engineering, Nov. 16, 2009, 5 pages.
Li, et al., "PR-Miner: Automatically Extracting Implicit Programming Rules and Detecting Violations in Large Software Code", In Proceedings of the 10th European Software Engineering Conference held jointly with 13th ACM SIGSOFT International Symposium on Foundations of Software Engineering, Sep. 5, 2005, 10 pages.
Gabel, et al., "Javert: Fully Automatic Mining of General Temporal Properties from Dynamic Traces", In Proceedings of 16th ACM SIGSOFT International Symposium on Foundations of Software Engineering, Nov. 9, 2008, 11 pages.
Nguyen, et al., "Graph-Based Pattern-Oriented, Context-Sensitive Source Code Completion", In Proceedings of the 34th International Conference on Software Engineering, Jun. 2, 2012, 11 pages.
Nguyen, et al., "Graph-based Mining of Multiple Object Usage Patterns", In Proceedings of 7th Joint Meeting of the European Software Engineering Conference and the ACM SIGSOFT Symposium on the Foundations of Software Engineering, Aug. 24, 2009, 10 pages.
Ottenstein, "The Program Dependence Graph in a Software Development Environment", In Proceedings of 1st ACM SIGSOFT/SIGPLAN Software Engineering Symposium on Practical Software Development Environments, vol. 19, Issue 5, May 1984, 8 pages.
Robillard, Martin P., "What Makes APIs Hard to Learn? Answers from Developers", In IEEE Software, vol. 26, Issue 6, Nov. 2009, 27 pages.
Robillard, et al., "A Field Study of API Learning Obstacles", In Journal Empirical Software Engineering, vol. 16, Issue 6, Dec. 2011, 4 pages.
Thummalapenta, et al., "PARSEWeb: A Programmer Assistant for Reusing Open Source Code on the Web", In Proceedings of 22nd IEEE/ACM International Conference on Automated Software Engineering, Nov. 5, 2007, 10 pages.
Thummalapenta, et al., "Alattin: Mining Alternative Patterns for Defect Detection", In Journal Automated Software Engineering, vol. 18, Issue 3-4, Apr. 8, 2011, 31 pages.
Witten, et al., "Data Mining: Practical Machine Learning Tools and Techniques", In Publication of Morgan Kaufmann, Jun. 10, 2005, 5 pages.
Wu, et al., "Iterative Mining of Resource-Releasing Specifications", In Proceedings of 26th IEEE/ACM International Conference on Automated Software Engineering, Nov. 6, 2011, 10 pages.
Zhang, et al., "Automatic Parameter Recommendation for Practical API Usage", In Proceedings of 34th International Conference on Software Engineering, Jun. 2, 2012, 11 pages.
Xie, et al., "MAPO: Mining API Usages from Open Source Repositories", In Proceedings of International Workshop on Mining Software Repositories, May 22, 2006, 4 pages.
"Microsoft® "Roslyn" CTP", Mar. 25, 2014, Available at: http://msdn.microsoft.com/en-us/vstudio/roslyn.aspx.
Wu, et al., "Supporting Materials", Mar. 25, 2014, Available at: http://research.microsoft.com/en-us/projects/code-completion/supportingmaterialcc.pdf.
Thummalapenta, et al., "SpotWeb: Detecting Framework Hotspots and Coldspots via Mining Open Source Code on the Web", In Proceedings of 23rd IEEE/ACM International Conference on Automated Software Engineering, Sep. 15, 2008, 10 pages.
"International Search Report & Written Opinion Received for PCT Patent Application No. PCT/CN2014/081228", Mailed Date: Mar. 31, 2015, 14 Pages.

* cited by examiner

300
- Filter code snippets to be grouped — 305
- Group code snippets according to method usages — 310
- Select representative code snippet for each group — 320
- Generate metadata for each representative code snippet — 330
- Store the representative code snippets in association with respective metadata — 340

FIG. 3

400
```
1. using (SqlCommand Cmd = conn.CreateCommand()){
2.    conn.Open();
3.    Cmd.CommandText = query;
4.    Cmd.CommandType = CommandType.Text;
5.    SqlDataReader dr = sqlCmd.ExecuteReader();
6.    if (dr.Read()){
7.       strTitle = (string)dr["Title"];
8.    }
9. dr.Close();
10.conn.Close();
11.}
```
420   430

410
```
1. using (SqlCommand Cmd = conn.CreateCommand()){
2.    conn.Open();
3.    Cmd.CommandText = query;
4.    Cmd.CommandType = CommandType.Text;
5.    SqlDataReader dr = sqlCmd.ExecuteReader();
6.    if (dr.Read()){
7.       strArtist = (string)dr["Artist"];
8.    }
9. dr.Close();
10.conn.Close();
11.}
```

FIG. 4

```
1.  public void DumpKeywords(String inThinFile,
        String outKeywords, Char delim){
2.    StreamReader sr = File.OpenText(inThinFile);
3.    StreamWriter sw = new StreamWriter
4.        (File.Open(outKeywords, FileMode.Create));
5.    String line = null;
6.    while ((line = sr.ReadLine()) != null)
7.    {
8.      String[] c = line.Split(delim);
9.      sw.WriteLine(c[0]);
10.   }
11.   sr.Close();
12.   sw.Close();
13. }
```

CODE RECOMMENDATION

RELATED APPLICATIONS

This application claims priority to International Application No. PCT/CN2014/081228, filed on Jun. 30, 2014, and entitled "CODE RECOMMENDATION." This application claims the benefit of the above-identified application, and the disclosure of the above-identified application is hereby incorporated by reference in its entirety as if set forth herein in full.

BACKGROUND

Code reuse may improve the efficiency of software development. For example, many application programming interface (API) methods can be invoked and used in various programming contexts to complete respective tasks. As known, a third-party API library may contain hundreds or even thousands of API methods or functions. Furthermore, in a software development project, software engineers usually design and implement lots of methods as internal APIs for later invocation. As a result, the number of project-specific API methods may be huge as well.

In practice, unfortunately, the knowledge about API methods and their usages is often not well documented. When using API methods, there are obstacles caused by inadequate or absent resources or knowledge for learning those API methods. A software engineer knows that there is a creation API method(s) which might be helpful to complete his/her task. However, he/she often could not remember the exact API method or how to use it. Conventional solutions for code recommendation and code completion usually suffer from insufficient accuracy, utility and/or user friendliness.

SUMMARY

At present, it is difficult to determine a suitable subset of the API methods for a particular programming task. Therefore, it is challenging for users to effectively and efficiently invoke and use the API methods in different programming contexts, especially for those users with relatively less knowledge about the APIs. In fact, without considering the specific programming context, some recommended codes are not suitable for the current task and thus are meaningless at all. Moreover, there might be tens of thousands of API methods in a large-scale code base, and a single API method may have several usages. Therefore it is important to provide high coverage of those API methods and the usages thereof. In the meantime, code recommendations should be succinct to avoid providing code snippets with essentially similar or same usage. In addition, if the user has to make an extra effort to determine how to adapt a recommended code snippet to the current programming context, the user experience would be degraded, especially with traditional user interfaces that do not support effective and efficient way to quickly browse, select, and/or edit the code recommendations.

One aspect of the subject matter described herein relates to construction of knowledge base storing usages of various methods. In one embodiment, code snippets are grouped according to the method usages which may be presented by the set of method invocations include in that code snippet. In order to achieve high coverage of method usages, in one embodiment, one or more code snippets to be grouped may be extracted in an invocation-centered manner. For any resulting group, a representative code snippet is selected. The represented code snippet is stored in the knowledge base in association with metadata at least indicating a variation point(s) in the representative code snippet. In this manner, the knowledge base is scalable and the metadata may provide useful information in recommendation.

Another aspect of the subject matter described herein relates to code recommendations. In one embodiment, the current programming context is obtained based on a method invocation. One or more candidate code snippets are retrieved from the knowledge base based on the programming context and recommended to a user. In one embodiment, the retrieved code snippets may be ranked according to one or more criteria. In one embodiment, it is possible to highlight one or more variation points in a recommended code snippet based on the associated metadata, such that the user can effectively and efficiently adapt the code snippet to the specific programming context. As a result, quality, usability and user friendliness of the code recommendations are improved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

FIG. 3 illustrates a flowchart for constructing knowledge base in accordance with one embodiment of the subject matter described herein;

FIG. 4 illustrates an example of variation points identified in a code snippet in accordance with one embodiment of the subject matter described herein;

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
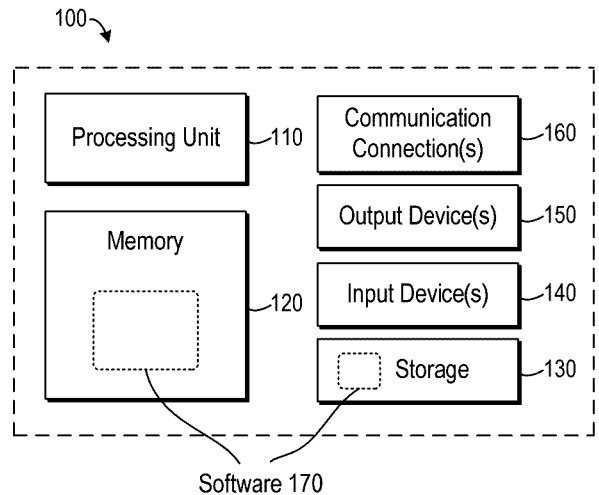
FIG. 1 illustrates a block diagram of a computing environment in which embodiments of the subject matter described herein may be implemented.

FIG. 1 illustrates an example of a computing environment 100 in which one or more embodiments of the subject matter described may be implemented. The computing environment 100 is not intended to suggest any limitation as to scope of use or functionality of the subject matter described herein, as various embodiments may be implemented in diverse general-purpose or special-purpose computing environments.

With reference to FIG. 1, the computing environment 100 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores at least a part of software 170 for constructing the knowledge base and/or code recommendations.

A computing environment 100 may have additional component or features. In the example shown in FIG. 1, the computing environment 100 includes storage 130, one or more input devices 140, one or more output devices 150, and one or more communication connections 160. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 130 may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment 100. The storage 130 may store at least a part of instructions for the software 170.

The input device(s) 140 may be one or more of various different input devices. For example, the input device(s) 140 may include a user device such as a mouse, keyboard, trackball, etc. The input device(s) 140 may implement one or more natural user interface techniques, such as speech recognition, touch and stylus recognition, recognition of gestures in contact with the input device(s) 140 and adjacent to the input device(s) 140, recognition of air gestures, head and eye tracking, voice and speech recognition, sensing user brain activity, and machine intelligence. As other examples, the input device(s) 140 may include a scanning device; a network adapter; a CD/DVD reader; or another device that provides input to the computing environment 100. The output device(s) 150 may be a display, printer, speaker, CD/DVD-writer, network adapter, or another device that provides output from the computing environment 100. The input device(s) 140 and output device(s) 150 may be incorporated in a single system or device, such as a touch screen or a virtual reality system.

The communication connection(s) 160 enables communication over a communication medium to another computing entity. Additionally, functionality of the components of the computing environment 100 may be implemented in a single computing machine or in multiple computing machines that are able to communicate over communication connections. Thus, the computing environment 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments of the subject matter can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment 100, computer-readable storage media include memory 120, storage 130, and combinations thereof.

Embodiments of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

Figure 2:
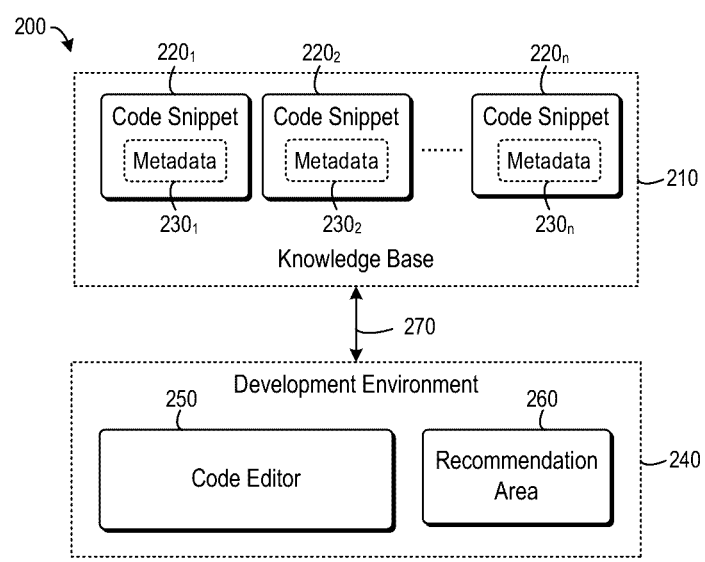
FIG. 2 illustrates a block diagram of a system for code recommendations in accordance with one embodiment of the subject matter described herein.

FIG. 2 illustrates a block diagram of a system 200 for code recommendations in accordance with embodiments of the subject matter described herein. As shown, the system 200 comprises a knowledge base 210. The knowledge base 210, among other things, store knowledge about usages of one or more methods that can be invoked in programming. By the way of example, in one embodiment, the knowledge base 210 is implemented as an API usage base which characterizes the usages for one or more API methods. In the following description, some embodiments will be discussed with reference to the API methods. However, it is to be understood that this is only for the purpose of illustration without suggesting any limitations on the subject matter described herein. Embodiments of the subject matter described herein are applicable to various kinds of methods that can be invoked or called in programming.

The knowledge base 210 contains a plurality of code snippets $220_1$, $220_2$, . . . $220_n$ (collectively referred to as "code snippets 220"). Each of the code snippets 220 contains one or more statements and represents a certain method usage. The code snippets may be obtained in any suitable manners. For example, in one embodiment, one or more code snippets 220 may be directly collected from one or more code bases and/or the Internet. Alternatively or additionally, the code snippets 220 may be generated from existing code segments. In one embodiment, one or more code snippets 220 are generated by a process including snippet extraction, grouping and selection. Examples of the code snippets 200 and the generation thereof will be discussed later.

As shown in FIG. 2, in one embodiment, the code snippets $220_1$, $220_2$, . . . $220_n$ have respective metadata $230_1$, $230_2$, . . . $230_n$ (collectively referred to as "metadata 230"). The metadata 230 describes any information of the associated code snippet 220 that may be useful in code recommendations. By the way of example, in one embodiment, the metadata 230 indicates one or more variation points in the associated code snippets 220. As used herein, the term "variation point" refers to a point in the code snippet that is likely to be specific to the programming tasks and need to be edited or specified by the user manually and/or by utilizing any suitable auto-coding technology. Example embodiment in this regard will be discussed later. Any other relevant information may be included in the metadata 230. For example, in one embodiment, the metadata 230 may include information about the source from which the associated code snippet 220 is obtained.

It is to be understood that a code snippet 220 and its associated metadata 230 are not necessarily stored together as shown in FIG. 2. Rather, in one embodiment, all or portions of the metadata 230 may be stored, for example, in a table or any other suitable data structure. Each entry in the table may be associated with a code snippet 220, for example, by an identifier of the code snippet 220.

The system 200 further comprises a development environment 240. The development environment 240 may be used to edit, store, debug, build and/or execute computer program codes. In one embodiment, the development environment 240 is an integrated development environment (IDE). Specifically, the development environment 240 includes a code editor 250 where the user may enter and/or edit codes. In one embodiment, the development environment 240 may further include a recommendation area 260. In operation, for example, while the user is typing the code in the code editor 250, programming context may be obtained. The programming context and possibly other relevant information may be used to query the knowledge base 210. In response, the knowledge based 210 will retrieve and return one or more code snippets 220 that are expected to be relevant to the programming context. Subject to some processing such as ranking, some or all of the code snippets 220 provided by the knowledge base 210 may be presented in the recommendation area 260 as code recommendations. By browsing, selecting, and/or editing the recommendations presented in the recommendation area 260, the user is able to complete his/her code with a recommended code snippet(s) 220.

The knowledge base 210 and the development environment 240 may communicate with each other via a bi-direction connection 270. In one embodiment, the knowledge base 210 and development environment 240 are co-located in a single physical machine. At this point, the connection 270 may be an inter-application or inter-process communication connection, for example. In another embodiment, the knowledge base 210 and development environment 240 are distributed in separate machines. In such embodiment, the connection 270 may be, for example, a computer network such as a local area network ("LAN"), a wide area network ("WAN") or the Internet, a communication network, a near field communication connection, or any combination thereof. It is to be understood that development environment 240 may utilize both a local knowledge base and a remote knowledge base. At this point, the connection 270 enables local and remote communications.

It is to be understood that although the code editor 250 and recommendation area 260 are shown as separate areas in FIG. 2, this is only for the purpose of illustration without suggesting any limitations on the subject matter described herein. Alternatively, the codes and recommendations may be displayed within a single area or window, a pop up window or frame, or in a drop down menu. By the way of example, in one embodiment, the recommendation area 260 may be implemented as a floating window that is displayed near the position of a cursor in the code editor 250.

Now construction of the knowledge base 210 will be described. FIG. 3 illustrates a flowchart of a method 300 for constructing the knowledge base 210. It is to be understood that the method 300 may be performed at any suitable timing. For example, in one embodiment, the knowledge base 210 may be constructed in advance. Additionally or alternatively, the method 300 may be performed after the knowledge base 210 has already deployed to process queries, such that the knowledge base 210 may be updated dynamically. Moreover, only for the purpose of illustration, the method 300 will be discussed with reference to API methods.

Generally, in the method 300, the knowledge base is constructed by grouping multiple code snippets. To this end, the method 300 is entered at step 305, where the code snippets to be grouped may be filtered to remove noises, thereby improving the accuracy of grouping. Depending on the criteria for grouping, the filtering may be done in various different ways. Examples of filtering will be described below. It is to be understood that the filtering of code snippets are not necessarily performed. In one embodiment, the code snippets may be directly grouped without being filtered.

At step 310, multiple code snippets are grouped to obtain one or more groups. Each of the code snippets to be grouped contains statements related to invocation of one or more API methods. The code snippets to be grouped may be obtained in any suitable manners. For example, in one embodiment, one or more of the code snippets may be extracted from existing code segments. Example embodiments in this regard will be discussed later. Alternatively, the code snippets to be grouped may be collected from a code base or from any suitable sources.

At step 310, the grouping is performed according to the method usages of the code snippets. That is, code snippets representing the same or similar method usage will be grouped together. In this way, each resulting group contains code snippets associated with the same or similar method usage.

As used herein, the method usage refers to a pattern of utilization of a method(s) that reflects how this method operates in a given context. The method usage may be represented in any suitable ways. For example, a method usage may be characterized by the set of parameters or variables, the set of method invocations, the order of method invocations, data dependencies, control flows, and/or any other suitable aspects. Accordingly, one or more of those aspects may be used to group the code snippets.

Specifically, in one embodiment, the code snippets can be grouped only depending on the sets of method invocations contained in the code snippets. This is feasible because the set of method invocations in the code snip-pet is able to characterize the semantics of the code snippet in most cases. Experiments show that for two code snippets with the same sets of method invocations, the variance of the invocation order, data dependencies and/or control flows may not be semantically significant. In such embodiment, the code snippets contain the same or similar set of method invocations are allocated into a single group. This approach is quite efficient and there is no need to tune parameters, which would be beneficial in terms of efficiency in practice.

As described above, in one embodiment, before the grouping of code snippets at step 310, it is possible to filter the code snippets to remove noises at step 305. By way of example, when the code snippets are grouped based on sets of method invocations, at step S305, one or more trivial method invocations may be removed from the code snippets. As used herein, the term "trivial method invocation" refers to a method invocation which provides only auxiliary functions and is less related to the semantics of the code snippet. By the way of example, invocations of API methods such as ToString function or logging functions may be considered as trivial method invocations. In one embodiment, one or more trivial method invocations may be defined and stored in advance. Specifically, the trivial method invocation may be customized for individual code bases. In operation, the code snippets to be grouped may be checked against the predefined trivial method invocations to remove the trivial method invocations, if any, in the code snippets. By filtering noise in this way, the code snippets can be grouped more accurately.

The method 300 then proceeds to step 320, where one or more representative code snippets is selected for each of the groups resulted from step 310. The representative code snippet may be stored into the knowledge base 210 as a code snippet 220 for subsequent query. In one embodiment, the representative code snippet for a group may be directly selected from the group, for example, on a random basis. Alternatively or additionally, a code snippet obtained from a trusted or authenticated source may be selected as a representative code snippet.

In order to further improve accuracy of the representative snippet selection, in one embodiment, the representative code snippet for a group may be selected by further grouping the code snippets in that group based on shapes of the code snippets. As used herein, the term "shape" of a code snippet refers to a sequence of statements that is obtained by tokenizing identifiers in the code snippet. More specifically, the shape of a code snippet may be considered as a transferred token sequence where the identifiers such as type names and variable names are replaced by the same token, while keeping the keywords and method invocations not tokenized. As described above, in one embodiment, the code snippets are grouped based on the sets of method invocations included in the code snippets, without considering the order of method invocations. By selecting the representative code snippet depending on the shapes of code snippets, the order of method invocations is taken into account. As such, the selected representative code snippets can reflect the method usage more accurately.

In such embodiment, for any group resulted from step 310, one or more subgroups may be obtained by further dividing the group based on the shapes of the code snippets. Next a subgroup may be selected at least in part based on the sizes of the subgroups. As used herein, the term "size" of a subgroup refers to the number of code snippets contained in the subgroup, or percentage or ration of code snippets contained in the subgroup compared to the subgroups as whole or other subgroups. In one embodiment, the subgroup of the largest size is selected.

Additionally or alternatively, user settings or preferences on coding styles of the code snippets in the subgroups may be taken into account as well. For example, in one embodiment, if there are two or more subgroups with the largest size, one of these subgroups may be selected according to the user preference. In such embodiment, a user may indicate his/her preference on coding styles in advance. By way of example, the user may define the use of try-catch-finally statements as a good coding style. According to such preference, the subgroup containing code snippets that use try-catch-finally statements can be selected. The authors, sources, generation time, and/or any other relevant information of the code snippets may be considered in subgroup selection.

Then a code snippet within the determined subgroup is selected as a representative code snippet. In one embodiment, the representative code snippet may be randomly selected from the determined subgroup. Optionally, the coding styles, source, author, generation time, and/or any other relevant information of individual code snippets in the selected subgroup may be taken into account.

Still with reference to FIG. 3, at step 330, metadata is generated for each representative code snippet as selected at step 320. The metadata may indicate any suitable information or knowledge about the representative code snippet. Specifically, in one embodiment, the metadata indicate one or more variation points in the representative code snippets. As described above, a variation point is a point in the code snippet that is likely to vary depending on specific programming tasks and thus might need to be edited or specified by the user manually or auto-coding technology. By indicating such variation points by the metadata, when the associated code snippet is recommended to the user, the variation points may be highlighted. As such, the user can easily reuse the code snippets by editing or setting specific values of the variation points according to the specific programming task and context. This would improve the coding efficiency and user experience. Example embodiments will be detailed below.

At step 330, the variation points in the representative code may be determined in various manners. As described above, in one embodiment, each of the groups obtained at step 310 may be further divided into subgroups based on the snippet shapes for selection of the representative code snippet. As a result, the code snippets within one subgroup have the same shape. In such embodiment, the variation point in the representative code snippet may be determined by identifying a difference(s) between the representative code snippet and one or more further code snippets in the same subgroup. For example, the different identifiers and/or literals between the selected representative code snippet and other code snippets in the same subgroup may be defined as variation points. FIG. 4 shows an example of identifying variation points.

In the example shown in FIG. 4, the code snippet 400 is the representative code snippet for a group and the code snippet 410 comes from the same subgroup as the representative code snippet 400. It can be seen that the code snippets 400 and 410 have the same shape and only differ from each other at identifiers at line 7. Accordingly, the identified point 420 and 430 at line 7 may be determined as variation points and stored in the metadata.

It is to be understood that the metadata may include any other relevant information. For example, in one embodiment, the metadata includes the information (for example, the identifier and/or full path name) of the source where the selected representative code snippet is obtained from. In code recommendations, such knowledge may help the user make a better decision on whether to reuse the code snippet if he/she is aware of the quality of the code in that source or can view the larger context of the usage of the code snippet.

Through steps 310 to 330, for each group that represents an API method usage, a representative code snippet and associated metadata are obtained. Then, at step 340, the representative code snippets are stored into the knowledge base 210 in association with their respective metadata. More specifically, each representative code snippet is stored as a code snippet 220 in the knowledge base 210, and the associated metadata is stored as the metadata 230.

It would be appreciated that in accordance with embodiments of the subject matter as described herein, the knowledge about the code snippets 220 included in the respective metadata 230 may be used in code recommendations to provide useful hints or guidelines, such that the user can easily determine how to modify the recommended code snippet to compete his/her current programming task. Additionally, embodiments of the subject matter described herein are applicable to large-scale code bases and are highly scalable. For example, it is possible to generate and collect the code snippets to be grouped in parallel. Alternatively or additionally, in one embodiment, the grouping may be accelerated by hashing techniques, for example. Accordingly, a large-scale API usage base may be efficiently constructed.

As discussed above, the code snippets to be processed by the method 300 to construct the knowledge base 210 may be obtained in various manners. For example, in one embodiment, one or more code snippets can be extracted from code segments. The code segments from which the snippets are extracted may be obtained from various sources such as existing code base and/or the Internet, for example. Given a target API method, a code snippet can be extracted in many different ways. For example, the function body in which the target method is invoked may be extracted as the code snippet. As another example, it is possible to extract a code fragment of predefined number of lines that contains the target method as the code snippet. Specifically, in order to efficiently and effectively extract the code snippet, code slicing technology may be used in one embodiment.

Figures 5, 6:
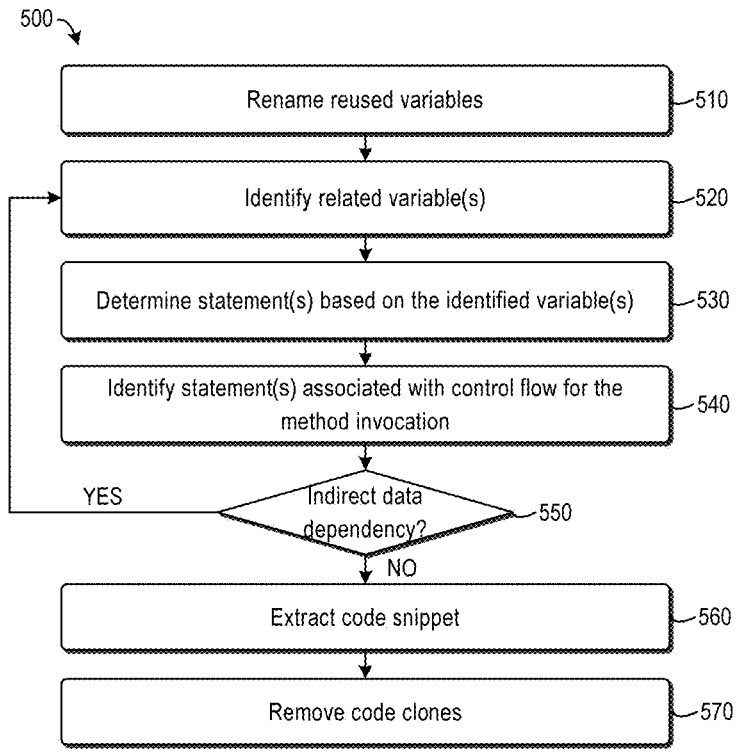
FIG. 5 illustrates a flowchart for extracting a code snippet from a code segment in accordance with one embodiment of the subject matter described herein.
FIG. 6 illustrates an example of code snippet extraction by invocation-centered slicing in accordance with one embodiment of the subject matter described herein.

FIG. 5 illustrates a flowchart of a method 500 for extracting a code snippet from a code segment based on code slicing. More specifically, in the method 500, the code snippet is extracted from a code segment based on data dependencies of statements associated with a given method invocation. That is, in this embodiment, the code snippet is extracted by invocation-centered code slicing.

As shown, the method 500 is entered at step 510, where reused variables in the code segment are renamed. As known, in practice, a variable might be reused within a method to perform different tasks for convenience. For example, within a single code segment, many software engineers are likely to repeatedly use "i" or "j" to represent variables in different code fragments such as method bodies or control loops. In this event, if two independent code fragments contain the same variable names, they might be incorrectly identified as having data dependency and thus cannot be separated when extracting code snippet based on the data dependencies. As a result, the reuse of variables would decrease the accuracy of code slicing process. By renaming such reused variables within the code segment at step 510 before code slicing, this problem can be solved. It is to be understood that as a pre-processing step, the renaming of reused variables is optional and can be omitted in some embodiments.

Next, a method invocation in the code segment may be selected as a target and the data dependencies of statements with the target method invocation may be determined Specifically, at step 520, one or more variables related to a selected target method invocation are identified. In one embodiment, the variables that are directly related to the target method invocation may be identified. Such variables include, but not limited to, the variables that are defined, used or returned by the target method invocation. Then, one or more statements that define, use, and/or return the identified variables may be determined at step 530.

In one embodiment, the method 500 then proceeds to step 540 to identify one or more statements associated with control flow for the target method invocation. For example, if the target invocation is located in a code branch or a loop, then the control flow statements "IF . . . THEN . . . ELSE" or "WHILE" may be identified at step 540. With the control flow statements, the extracted code snippet can reflect the method usage more accurately. In one embodiment, the control flow statements identified at step 540 may be directly included in the code snippet. In an alternative embodiment, the identified control flow may be indicated in the metadata in any suitable manner. However, it is to be understood that the code snippet may be extracted without identifying the control flow. That is, the step 540 can be omitted and the code snippet extraction works as well only depending on the data dependency.

In one embodiment, at step 550, it is determined whether to continue identifying indirect data dependency with the target method invocation. If so (branch "YES"), the method 500 repeats step 520, 530 and possibly 540. It would be appreciated that in the first round of processing, at step 520, the variable(s) that are directly related to the target method invocation is identified. Accordingly, any statement determined at step 530 has direct data dependency with the target method invocation. In the subsequent round, the variables identified at step 520 and the statements determined at step 530 are related to the statements determined in the previous round and thus have indirect data dependencies with the target method invocation.

By repeating steps 520 to 540 one or more times, one or more higher levels of usage for the target method invocation may be obtained. As such, the extracted usage would be more complete and accurate. However, it is to be understood that higher levels of usage are not necessarily required. In one embodiment, steps 520, 530 and possibly 540 may be performed only once to extract the first level of usage.

If it is determined at step 550 that no more indirect data dependency is to be extracted (branch "NO"), the method 500 proceeds to step 560 to extract the code snippet. Specifically, the statements determined at 530 are extracted at step 560 as a part of the code snippet. Furthermore, in those embodiments where the control flow statements are determined at step 540, the control flow statements are also extracted at step 560 into the code snippet.

FIG. 6 shows an example of extracting the code snippet with the method 500. In the code segment 600, suppose that the invocation of the API method StreamReader.ReadLine at line 6 is the target method invocation. This API method has an input parameter sr which is constructed by invoking the method File.OpenText at line 2 and closed at line 11. The target API method invocation has an output parameter line which is initialized at line 5 and processed at line 8. In addition, it can be seen that in the shown example the API method StreamReader.ReadLine is invoked in a WHILE loop from lines 6 to 10. Thus the control flow statements at lines 6, 7 and 10 are also parts of the API usage. Then all the statements that have data dependencies with the method invocation StreamReader.ReadLine at line 6 and its related control-flow statements are extracted from the code segment 600 to form the code snippet which is underlined in FIG. 6.

It would be appreciated that in the example shown in FIG. 6, only the first level of usage is extracted and utilized. In another embodiment, as discussed above, it is possible to extract one or more further levels of the method usage. For example, the method invocation File.OpenText may be then analyzed to determine its direct dependencies which are indirect dependencies for StreamReader.ReadLine. As such, the second level of usage may be extracted.

Figures 7, 8:
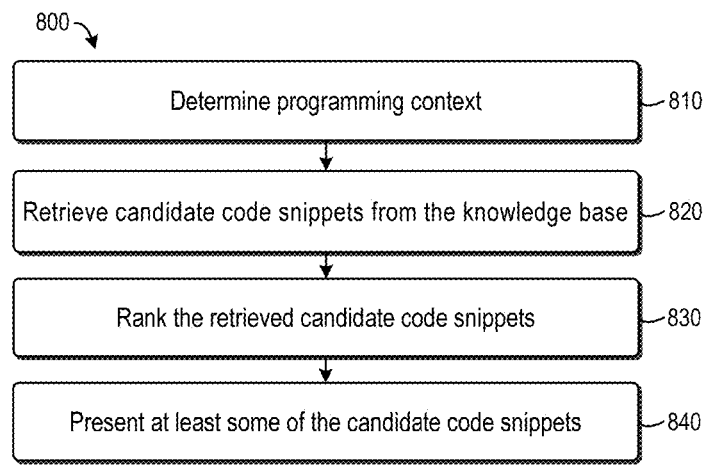
FIG. 7 illustrates an example of code clones present in an extracted code snippet in accordance with one embodiment of the subject matter described herein.
FIG. 8 illustrates a flowchart of a method for code recommendations in accordance with embodiments of the subject matter described herein.

With reference to FIG. 5, in one embodiment, the extracted code snippet may be further processed at optional step 570 to remove code clones. As used herein, the term "codes clones" refer to two or more code fragments that are syntactically the same after the normalization and tokenization. FIG. 7 shows an example of a code snippet 700 that is extracted using the invocation of the method new SqlCommand as the target method invocation. It can be seen that the code fragment 720 at lines 4 to 5 and the code fragment 730 at lines 6 to 7 are clones of the code fragment 710 at lines 2 to 3. Such clone codes provide no extra knowledge in terms of the usage of the target method new SqlCommand and thus may be removed or filtered at step 570.

To this end, in one embodiment, an efficient technique is used to detect and remove clone code. Given an extracted code snippet, the codes contained in the snippet is first normalized and tokenized. That is, all variable names and literals are replaced with the same token. For example, with reference to FIG. 7, in fragments 710 and 720, the variables and literals "@StsCode," "SqlDbType.Int," "0," "result-Code," "@ErrMsg," "SqlDbType.VarChar," "1," and "error-Text" may all be replaced with a same token, for example, "X". Then the code snippet may be checked for any duplicate sub-string. Any sub-string detection algorithm, no matter currently known or developed in the future, may be applied herein. In one embodiment, for the cloned code fragments detected in a code snippet, one of them is maintained and the others are removed.

With the method 500, the code snippets are extracted by slicing the code segments in an invocation-centered manner. By applying the code snippet extraction process 500 on a plurality of code segments, the usages for multiple API methods in a code base can be obtained, without ignoring the API methods with less frequent usage. In fact, by selecting different target method invocation, it is possible to extract more than one code snippet from a single code segment. In this way, the extracted code snippets may cover a significant portion of the API method invocations as well as their usages in the code base. Moreover, in the snippet extraction, the code in each method body in the code base may be processed independently and can be executed in parallel. In addition, by means of the pre-processing (reused variable renaming at step 510) and post-processing (code clone removal at step 570) as well as the incorporation of control flow statements, the extracted code snippets can be more accurate and complete. Then the code snippets extracted by the method 500 can be grouped by the method 300 and thus used to construct the knowledge base 210, as discussed above with reference to FIG. 3.

Now the code recommendations based on the code knowledge base will be discussed. Reference is made to FIG. 8 which shows a flowchart of a method 800 for code recommendations.

The method 800 is entered at step 810 where a programming context for the code segment in consideration is determined. For example, the code segment may be the one that is being input or edited in the code editor 250 in the development environment 240 shown in FIG. 2. In one embodiment, an invocation-centered technique is utilized such that the programming context is obtained at least in part based on data dependency with a method invocation in the code. For example, considering the fact that the last method invocation statement which is close to the last character that the user has input often best reflects the user's intent, in one embodiment, it is possible to utilize invocation of the last method (denoted as "m") entered into the code editor 250 to automatically extract the programming context.

Then a sequence of methods $q=<I_0, I_1, \ldots, I_{n-1}>$ that are invoked in the code segment and that have data dependencies with the method invocation is determined. In the sequence q, $I_i$ (i=0, ..., n−1) is the i-th invoked method from the beginning of the body of the function under development. The statements that invoke $I_i$ have data dependencies with the statement that invokes m. Each $I_i$ may be identified in a similar manner to steps 520 and 530 in the method 500 as discussed above. Specifically, similar to the invocation-centered code slicing technique as discussed with reference to FIG. 5, a method $I_i$ in the sequence q may have either direct or indirect data dependency with the method invocation m. As such, the sequence of invoked methods q reflects the user's intent and may be used as the programming context.

The method 800 proceeds to step 820, where one or more candidate code snippets are retrieved from a knowledge base 210 at least in part based on the programming context determined at step 810. In one embodiment, given a programming context, for example, in the form of invoked method sequence q, a collection (denoted as C) of candidate code snippets that are roughly relevant to q may be determined at the knowledge base 820. For example, the collection C may be determined in such a way that each candidate code snippet in C invokes at least one method in the programming context q.

Next, at least some of the candidate code snippets retrieved at step 820 may be presented to the user, for example, in the recommendation area 260 as code recommendations. In one embodiment, all the candidate code snippets that are retrieved at step 820 may be recommended to the user. In order to further improve the accuracy and user friendliness of recommendation, in one embodiment, the retrieved candidate code snippets may be filtered or ranked at step 830 according to a set of predefined criteria or rules. One or more top-ranked code snippets are then recommended to the user. By the way of example, in one embodiment, the ranking may be done in two stages.

In such embodiment, the predefined criteria for ranking the candidate code snippets may include, but not limited to, one or more of the following: relevance of the candidate code snippets to the programming context, popularity of usage of the candidate code snippets, conciseness of the candidate code snippets, and diversity or succinctness of the code recommendations. It is to be understood that these criteria are only for the purpose of illustration, without suggesting limitations on scope of the subject matters described herein. Any alternative or additional suitable factors, criteria, or rules may be utilized to filter or rank the candidate code snippets at step 830. For example, the sources, authors, and/or user preferences related to the candidate code snippets may be taken into account. Relevance indicates the degree to which a code snippet matches the programming context. The popularity of usage indicates how many times or how frequently a code snippet is selected and used previously (either or both by the current user or by the community of users in the data set). The conciseness relates the degree of readability or clarity of the code snippets. The diversity or succinctness means that in the recommended code snippets, it is desired to cover expected method usages as many as possible. That is, a succinct list of recommendations is desired where different code snippets represent different method usages.

Such criteria may be used either alone or in any combinations. For example, in one embodiment, the candidate code snippets retrieved at step 820 may be first ranked and/or filtered according to at least one criteria (for example, at least one member or combination of the relevance, popularity of usage and conciseness) and then re-ranked and/or filtered according to a second criteria (for example, at least of or both of the diversity or succinctness).

More specifically, in one embodiment, the first-stage ranking at step 830 is performed according to the relevance and popularity of usage. For each candidate code snippet s in the collection C, a score (denoted as "$score_1$") defined as follows is calculated:

$$score_1 = \alpha \times Relevance(q,s) + (1-\alpha) \times Support(s) \quad (1)$$

where α represents a parameter ranging from 0 to 1; Relevance(q, s) represents the relevance between s and the programming context q determined at step 810; and Support(s) represents the popularity of usage for the code snippet s.

In one embodiment, Relevance(q, s) may be defined as follows:

$$Relevance(q,s) = MatchScore(q,s) \times Penalty(q,s) \quad (2)$$

where MatchScore(q,s) represents the match degree of s and q, and Penalty(q,s) represents a penalty function against MatchScore(q,s).

As discussed above, it can be assumed that the last method invocation statement which is close to the last character that the use has input often best reflects the user's intent. Therefore, in one embodiment, MatchS(q,s) may be defined in such a way that more weight is given to a matched method that is relatively closer to the last character that the user has input. By way of example, MatchScore(q,s) may be defined as follows:

$$MatchScore(q,s) = \begin{cases} \dfrac{\sum_{i=0}^{n-1}(e^{\gamma \cdot i} \times isMatch_i)}{\sum_{i=0}^{n-1} e^{\gamma \cdot i}}, & \text{if ratio} < 1 \\ 0, & \text{if ratio} = 1 \end{cases} \quad (3)$$

where $isMatch_i$ represents a value which is set to 1 when the i-th invoked method in the programming context q appears in s and set to 0 otherwise; γ represents a parameter whose value may be defined in advance; and ratio represents the number of matched methods divided by the number of methods in s. If ratio is equal to 1, it means that the code snippet s does not provide any new methods and thus is not much meaningful to be recommended. In this event, MatchScore will be set to 0.

In one embodiment, Penalty(q,s) in equation (2) may be a decreasing function of the relevance between s and q which in one example may be defined as follows:

$$Penalty(q,s) = \frac{1 - e^{-\mu/ratio}}{1 - e^{-\mu}} \quad (4)$$

where μ represents a parameter whose value may be defined in advance. It would be appreciated that when the code snippet s is more relevant to the programming context q, the value of ratio will increase and thus the value of Pe(q,s) will decrease. As described above, in one embodiment, a code snippet can be selected as a candidate if it contains at least one method in the programming context q. As a result, one or more candidate snippet codes s might include invocations of methods that are unmatched or irrelevant to the current programming context q. By use of Pen(q,s), the impact of these unmatched or irrelevant methods included in the candidate code snippets may be taken into account when ranking the candidate code snippets.

In one embodiment, Support(s) in equation (1), which represents the popularity of the code snippet s, may be defined as a normalized value of the number of code snippets in the knowledge base 210 that have the same set of method invocations with the code snippet s. By way of example, in one embodiment, Support(s) may be defined as follows:

$$Support(s) = \frac{\log(1 + Frequency(s))}{\log(1 + Max\_Frequency)} \quad (5)$$

where Frequency(s) represents the number of the code snippets in the knowledge base 210 that have the same set of method invocations with s, which may be determined, for example, when the knowledge base 210 is constructed; and Max_Frequency represents the maximum of Frequency(s) for all the code snippets s in the knowledge base. It would be appreciated that Support(s) is the normalized value of Fre(s).

It is to be understood that the metrics described above in equations (1) to (5) are only for the purpose of illustration without suggesting any limitations on the subject matter described herein. As an example, the Rel(q,s) and Support(s) may be used independently, or any combination of the metrics may be suitable. As another example, the $score_1$ may be defined by taking the conciseness into consideration. The conciseness may be measured by the length of the code snippet, for example.

By ranking the candidate code snippets according to the relevance, popularity of usage and/or conciseness in the first stage, the top k*m candidate code snippets with the highest scores may be selected for the second-stage ranking, where k represents the desired size of the recommendation list and m is a constant. By way of example, in one embodiment, the value of m may be set to 2.5. Next, the top k*m snippet candidates (denoted as collection C') obtained from the first-stage ranking may be re-ranked in the second stage such that only the top k candidate code snippets are output as recommendations. The re-ranking is performed according to the diversity and/or succinctness to ensure that the top k ranked code snippets are dissimilar to each other as much as possible.

In one embodiment for including diversity ranking, the code snippet in C' with the highest value of $score_1$ as defined in equation (1) is kept first. Each remaining snippet s in C' is re-ranked using a score (denoted as $score_2$) that measure the degree of dissimilarity between two code snippets. In one embodiment, $score_2$ may be defined as a weighted average of $score_1$ and the minimized dissimilarity between the code snippet s and the code snippets that are already selected into the collection C. By way of example, in one embodiment, $score_2$ may be expressed as follows:

$$score_2 = \beta \times score_1 + (1-\beta) \times Min(Disimilarity(s,s')) \quad (6)$$

where $\beta$ presents a parameter ranging from 0 to 1 that is used to adjust the weight; Disimilarity(s,s') represents the dissimilarity between s and s'; and s' represents the code snippets already selected into the collection C'; and Min( ) represents a function that returning the minimum. As such, $score_2$ for a code snippet s will increase as the similarity between s and the snippets that are already recommended decreases.

The code snippet with the highest value of $score_2$ is ranked as the second position in C'. Next, the remaining snippets are re-ranked again and the one with the highest value of $score_2$ is selected as the third recommendation. By iteratively repeating this process, the top k code snippets to be recommended are determined and presented to the user in order. In one embodiment, the candidate code snippets with lower rankings may be filtered out or removed. Alternatively, these candidate code snippets may be reserved, which will be discussed later.

It is to be understood that the step 830 can be omitted in some embodiment. For example, in one embodiment, it is possible to recommend all the candidate code snippets that are retrieved at step 820 to the user without filtering or ranking.

Still with reference to FIG. 8, at step 840, one or more candidate code snippets may be presented to the user, for example, in the recommendation area 260 as code recommendations. By way of example, the recommended code snippets may be displayed as a list in the recommendation area 260, for example, according to the ranking at step 830. The recommended code snippets may be presented in any suitable manner. As an example, in one embodiment, each code snippet may be represented by a summary, for example, including the first several lines of the code snippet. As another example, a thumbnail may be used to present a recommended code snippet. Upon selection by the user, the selected code snippet can be expanded.

In one embodiment, upon a threshold period of time or upon request from the user, the presented list of recommended code snippets can be expanded to include additional code snippets. For example, in those embodiments where the retrieved code snippets are filtered or ranked, the expanded list may display those code snippets that were initially filtered out or ranked lower than the initial presented list of code snippets.

By recommending one or more candidate code snippets to the user at step 840, the user may check whether the target API method is utilized in a correct and/or effective way. Moreover, as discussed above, the last method entered by the user may be selected as the target method. In the meantime, at least some of recommended code snippets may contain one or more statements subsequent to the target method and thus can be used as predictions of what the user is trying to do. As such, the user is able to select and reuse one or more recommended code snippets that match his/her task or desire for code completion.

It is to be understood that the code recommendation method 800 may be triggered in different ways. In one embodiment, the retrieval and/or display of code recommendations may be automatically enabled. For example, if certain keywords or characters are detected while the user is typing characters into the code editor 250, the method 800 may be activated to retrieve and recommend relevant code snippets. Alternatively or additionally, the code recommendations may be disabled or enabled by the user. For example, in one embodiment, the user is enabled to activate and deactivate the retrieval and/or display of recommended code snippets in any suitable interaction manners.

Specifically, as described above, the snippet codes 220 stored in the knowledge base 210 may have associated metadata 230. Accordingly, in one embodiment, the metadata may be retrieved along with the associated code snippet at step 820. When a code snippet is recommended to the user, some relevant or auxiliary information may be displayed based on the metadata. For example, for one or more presented code snippets, the source file and/or any other relevant as indicated by the associated metadata may be displayed. Alternatively or additionally, in one embodiment, the variation point(s) in one or more recommended code snippets may be highlighted. As described above, a variation point could be set or edited by the user manually, or modified by auto-coding technology. By highlighting the variation points such as the points 420 and 430 shown in FIG. 4, the user can effectively and efficiently determine how to adapt the recommended code snippet to complete the current programming task. In this way, the coding efficiency and user experience will be improved.

Figure 9:
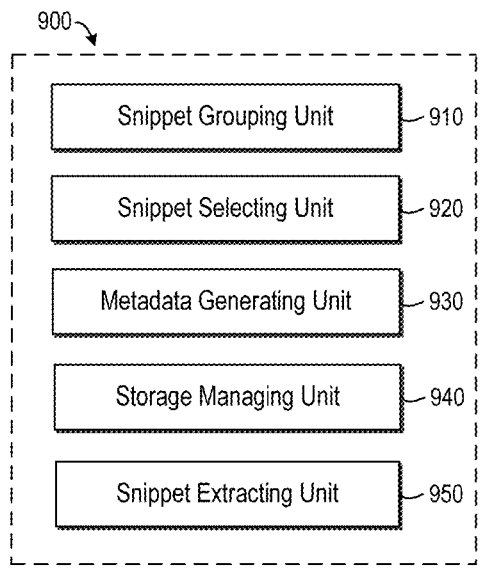
FIG. 9 illustrates a block diagram of a system for constructing knowledge base in accordance with embodiments of the subject matter described herein.

FIG. 9 shows a block diagram of a system 900 for constructing the knowledge base 210. As shown, system 900 may comprise a snippet grouping unit 910 configured to obtain one or more groups of code snippets based on method invocations included in the code snippets, and a snippet selecting unit 920 configured to select representative code snippets for the groups, respectively. The system 900 also comprises a metadata generating unit 930 configured to generate, for any given representative code snippet, metadata at least indicating a variation point in the representative code snippet. The system 900 further comprises a storage managing unit 940 configured to store the representative code snippets in association with the metadata in the knowledge base.

In one embodiment, one or more predefined trivial method invocations may be removed from the code snippets prior to the grouping. In one embodiment, the snippet selecting unit 920 is configured to divide the group into subgroups based on shapes of the code snippets within the group, to select one of the subgroups at least in part based on sizes of the subgroups, and to select the representative code snippet from the selected subgroup. In such embodiment, the metadata generating unit 930 is configured to generate the metadata by determining a difference between the representative code snippet and a further code snippet in the determined subgroup and identifying the variation point based on the determined difference.

In one embodiment, the system 900 may comprise a snippet extracting unit 950 configured to extracting a code snippet from a code segment based on a method invocation in the code segment. For example, in one embodiment, snippet extracting unit 950 is configured to perform the method 500 as discussed above to extract one or more code snippets from code segments in a code base.

Figure 10:
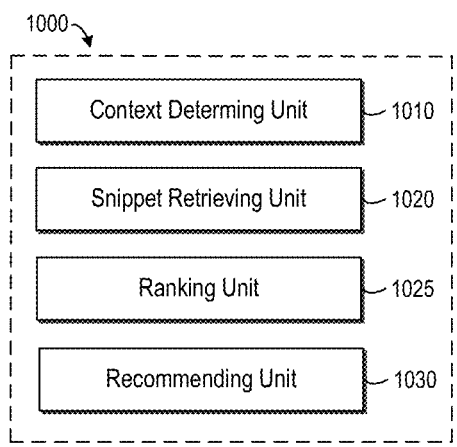
FIG. 10 illustrates a block diagram of a system for code recommendations in accordance with embodiments of the subject matter described herein.

FIG. 10 shows a block diagram of a system 1000 for code recommendations in accordance with embodiments of the subject matter described herein. As shown, the system 1000 comprises a context determining unit 1010 configured to obtain a programming context for a code segment at least in part based on data dependency with a method invocation in the code segment; a snippet retrieving unit 1020 configured to retrieve candidate code snippets from a knowledge base at least in part based on the obtained programming context; and a recommending unit 1030 configured to present at least some of the retrieved candidate code snippets as code recommendations.

In one embodiment, the context determining unit 1010 is configured to obtain the programming context by determining a sequence of methods invoked in the code segment that have data dependencies with the method invocation.

In one embodiment, the system 1000 may further comprise a ranking unit 1025 configured to rank the retrieved candidate code snippets according to predefined criteria. Accordingly, the recommending unit 1030 may be configured to present the ranked candidate code snippets. For example, in one embodiment, the predefined criteria include at least one of: relevance of the candidate code snippets to the programming context; popularity of usage of the candidate code snippets; conciseness of the candidate code snippets; and diversity of the code recommendations. In such embodiment, the ranking unit 1025 may be configured to rank the retrieved candidate code snippets according to at least one of the relevance, the popularity of usage and the conciseness, and to re-rank the ranked candidate code snippets according to the diversity, such that a predefined number of the re-ranked candidate code snippets are dissimilar to each other.

Alternatively or additionally, in one embodiment, the recommending unit 1030 is configured to highlight a variation point in at least one of the presented code snippets, the variation point indicated by metadata associated with the at least one presented code snippets.

It is to be understood that the systems 900 and 1000 may be remotely located in separate machines, or co-located in a single physical machine. That is, the construction and use of knowledge base may be implemented by different entities or by a single entity. Moreover, it is to be understood that the methods 300 and 500 may be performed by a single entity or by different entities. That is, the functionalities of code snippet extraction and knowledge base construction may be implemented integrally or separately.

In addition to or instead of computer-executable instructions stored on computer storage medium, parts or all of the subject matter described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented at least in part by a computer comprising:
    obtaining, at a development environment, a group of code snippets based on method invocations included in the code snippets;
    selecting a representative code snippet for the group;
    generating metadata for the representative code snippet, the metadata at least indicating a variation point in the representative code snippet; and
    storing the representative code snippet in association with the metadata in a knowledge base.

2. The method of claim 1, wherein a code snippet within the group is obtained by extracting the code snippet from a code segment based on a method invocation in the code segment.

3. The method of claim 2, wherein extracting the code snippet comprises:
    identifying at least one variable that is related to the method invocation in the code segment;
    determining, based on the at least one variable, at least one statement that has data dependency with the method invocation in the code segment; and
    extracting the at least one statement from the code segment as a part of the code snippet.

4. The method of claim 3, wherein the at least one statement includes a statement that has indirect data dependency with the method invocation.

5. The method of claim 2, further comprising:
    renaming a variable that is reused in the code segment prior to the extracting.

6. The method of claim 2, wherein extracting the code snippet comprises:
    extracting at least one statement associated with a control flow for the method invocation.

7. The method of claim 2, further comprising:
    detecting code fragments that are syntactically identical to each other in the extracted code snippet; and
    removing code clone from the extracted code snippet based on the identified code fragments.

8. The method of claim 1, wherein selecting the representative code snippet comprises:
    dividing the group into subgroups based on shapes of the code snippets within the group, the shape of a code snippet being a sequence of statements that is obtained by tokenizing identifiers in the code snippet;
    determining one of the subgroups at least in part based on sizes of the subgroups; and
    selecting the representative code snippet from the determined subgroup.

9. The method of claim 8, wherein generating the metadata for the representative code snippet comprises:
    identifying a difference between the representative code snippet and a further code snippet in the determined subgroup; and
    determining the variation point based on the identified difference.

10. The method of claim 1, further comprising:
    removing a predefined trivial method invocation from the code snippets prior to the obtaining of the group.

11. The method of claim 1, wherein the group of code snippets is associated with a usage of an application programming interface (API) method.

12. A system comprising:
    a processor arranged to perform steps comprising:
        obtaining, at a development environment, a group of code snippets based on method invocations included in the code snippets;
        selecting a representative code snippet for the group;
        generating metadata for the representative code snippet, the metadata at least indicating a variation point in the representative code snippet; and
        storing the representative code snippet in association with the metadata in a knowledge base.

13. The system of claim 12, wherein a code snippet within the group is obtained by extracting the code snippet from a code segment based on a method invocation in the code segment.

14. The system of claim 13, wherein extracting the code snippet comprises:
   identifying at least one variable that is related to the method invocation in the code segment;
   determining, based on the at least one variable, at least one statement that has data dependency with the method invocation in the code segment; and
   extracting the at least one statement from the code segment as a part of the code snippet.

15. The system of claim 14, wherein the at least one statement includes a statement that has indirect data dependency with the method invocation.

16. The system of claim 13, wherein extracting the code snippet comprises:
   extracting at least one statement associated with a control flow for the method invocation.

17. The system of claim 13, further comprising:
   detecting code fragments that are syntactically identical to each other in the extracted code snippet; and
   removing code clone from the extracted code snippet based on the identified code fragments.

18. The system of claim 12, wherein selecting the representative code snippet comprises:
   dividing the group into subgroups based on shapes of the code snippets within the group, the shape of a code snippet being a sequence of statements that is obtained by tokenizing identifiers in the code snippet;
   determining one of the subgroups at least in part based on sizes of the subgroups; and
   selecting the representative code snippet from the determined subgroup.

19. The system of claim 18, wherein generating the metadata for the representative code snippet comprises:
   identifying a difference between the representative code snippet and a further code snippet in the determined subgroup; and
   determining the variation point based on the identified difference.

20. The system of claim 12, wherein the group of code snippets is associated with a usage of an application programming interface (API) method.

* * * * *